April 28, 1953  J. C. OWEN ET AL  2,636,698
AUTOMATIC STEERING SYSTEM
Filed Dec. 17, 1948  3 Sheets-Sheet 1
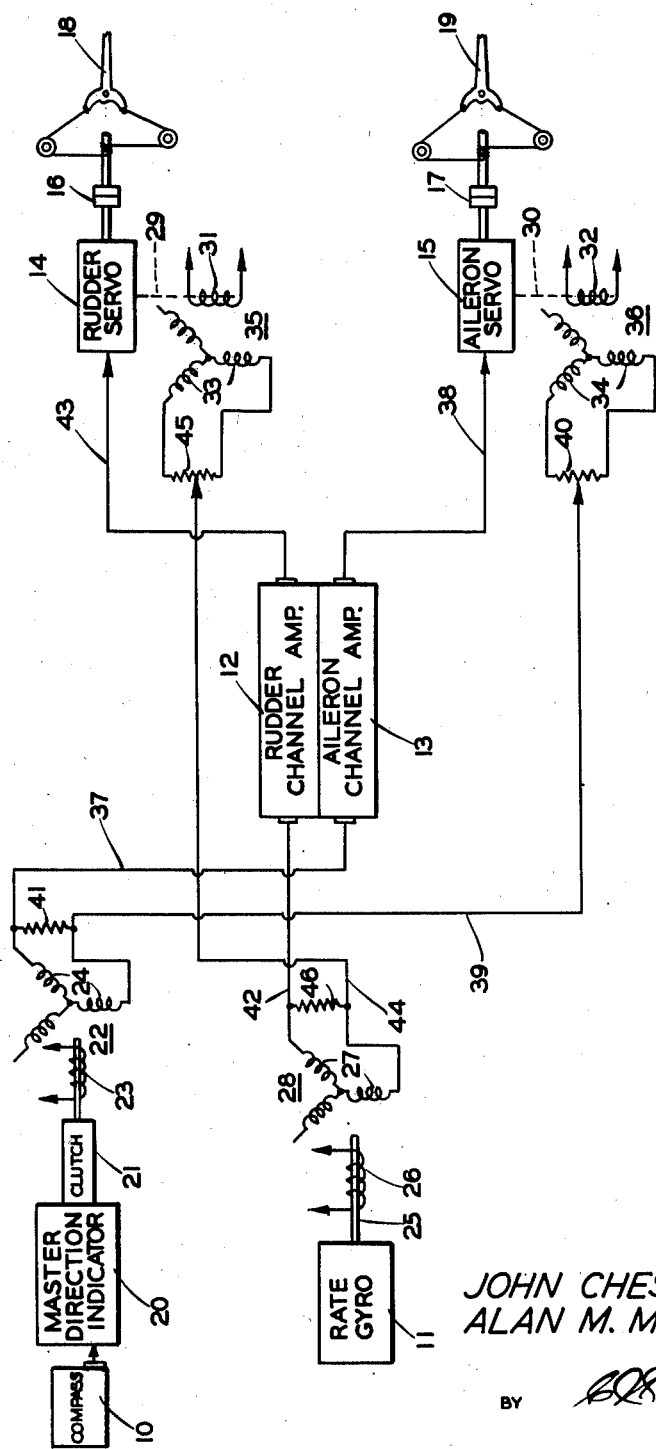
INVENTORS
JOHN CHESTER OWEN
ALAN M. MAC CALLUM
BY
ATTORNEY

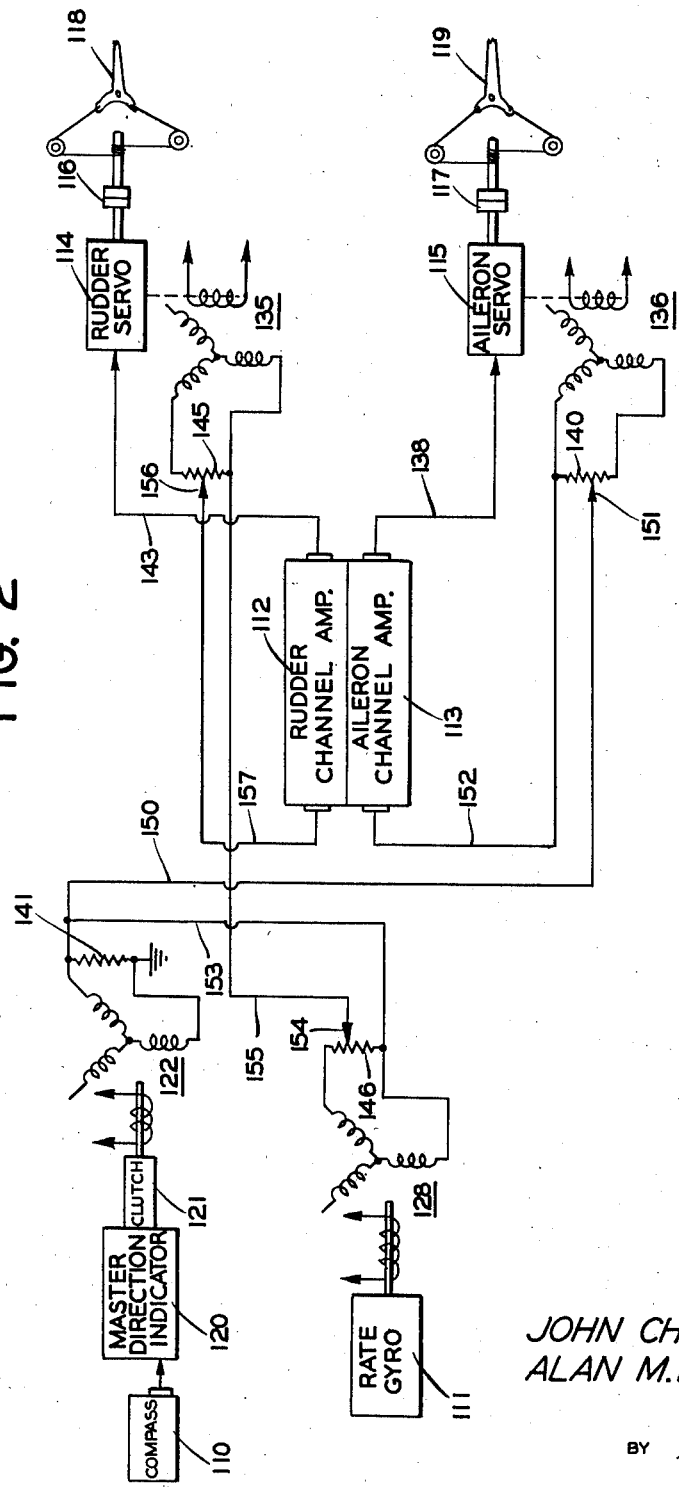

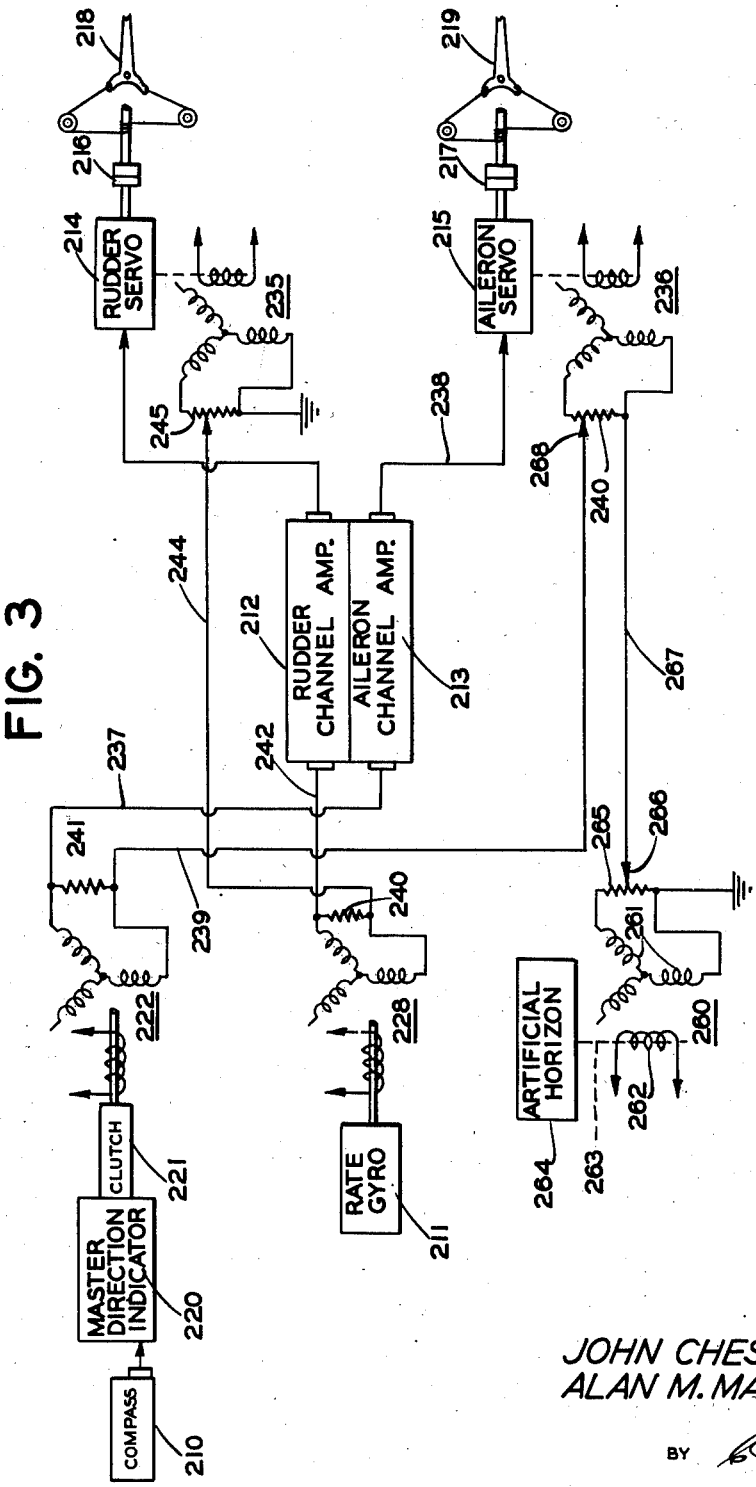

Patented Apr. 28, 1953

2,636,698

UNITED STATES PATENT OFFICE 2,636,698

AUTOMATIC STEERING SYSTEM

John C. Owen, Palisades Park, and Alan M. Mac-Callum, Maywood, N. J., assignors to Bendix Aviation Corporation, Teterboro, N. J., a corporation of Delaware Application December 17, 1948, Serial No. 65,768

2 Claims. (Cl. 244—77)

This invention relates to automatic steering systems for mobile craft and more particularly to aircraft automatic pilot systems wherein coordinated flight control is achieved by making the craft roll axis dependent on craft attitude about its yaw axis and the craft yaw axis is made to depend on craft attitude about its roll axis.

When an aircraft in normal, level and straight flight is caused to turn about its vertical or yaw axis, that is, to change its heading, its wing will assume an inclined position with the lowermost edge thereof pointed in the direction of the turn and the craft will, therefore, assume a bank angle which will be a function of the craft rate of turn. Conversely, when an aircraft in normal, level and straight flight is caused to turn about its longitudinal or roll axis, that is, to assume a bank angle, the craft will change its heading in the direction containing the lower wing, the rate of change of heading as a result of such bank angle being a function of the angle of bank.

The present invention contemplates the utilization of the foregoing action to provide an automatic steering system for a mobile craft in which direction or heading control is developed through aileron whereby smooth and coordinated craft flight control is obtained.

An object of the present invention, therefore, is to provide a novel automatic steering system for mobile craft.

Another object of the invention is to provide a novel aircraft automatic pilot in which craft direction is controlled through aileron.

A further object is to provide a novel aircraft automatic pilot in which craft direction and attitude are maintained without gyro stabilization of the craft roll axis.

Another object is to provide a novel aircraft automatic pilot in which signals developed during a craft change of direction are communicated to the aileron channel of the pilot whereby the craft is returned to its initial heading by operation of the ailerons.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings,

Figure 1 is a diagrammatic illustration of an automatic steering system for mobile craft embodying the subject-matter of the present invention;

Figure 2 is a diagrammatic illustration similar to Figure 1 in which a direction displacement signal is fed into the rudder channel as well as the aileron channel of the novel automatic pilot hereof; and Figure 3 is a diagrammatic illustration similar to Figure 1 in which gyro control as well as direction displacement control are both utilized to operate the aileron channel of the pilot.

Referring now to the drawings for a more detailed description of the present invention and more particularly to Figure 1 thereof, the novel automatic steering system hereof is shown as comprising either a directional gyro or a magnetic or earth inductor compass 10, a rate of turn gyroscope 11, rudder and aileron channel amplifiers 12 and 13, as well as rudder and aileron servomotors 14 and 15 together with clutches 16 and 17 adapted to connect or disconnect the rudder and aileron servomotors to and from rudder and aileron surfaces 18 and 19.

The direction displacement or heading signal developed by compass 10 is communicated in a well known manner to a master direction indicator 20 wherein a motor is energized to run an inductive device to a null and simultaneously to displace a pointer therewith to indicate the amount of heading change, a clutch 21 being provided between the motor of indicator 20 and an inductive displacement signal device 22 having an angularly movable rotor winding 23 inductively coupled with a fixed and wound stator 24. The structure for and the manner in which the compass displacement signal is repeated at wound stator 24 for control purposes is more fully shown and described in copending application Serial No. 516,488 filed December 31, 1943 and assigned to the assignee of the present application and now U. S. Patent No. 2,625,348, issued January 13, 1953.

A trunnion 25 of rate gyro 11 supports thereon for angular displacement therewith a wound rotor 26 which is inductively coupled with a wound stator 27 of an inductive rate device 28 while both rudder and aileron servomotors 14 and 15 support for angular displacement thereby through suitable connections 29 and 30, respectively, wound rotors 31 and 32 which are inductively coupled with wound stators 33 and 34 of inductive rudder and aileron follow-up devices 35 and 36.

While the direction displacement signal with conventional automatic steering systems has been introduced directly into the rudder channel amplifier of the system it has been discovered that with some aircraft, particularly of the type having wings angularly inclined to the transverse axis of the craft, better known as wing dihedral, the control acquired was not as smooth as desired.

In accordance with the present invention, the foregoing disadvantage is overcome and smooth coordinated flight control effected thereby. To this end, one side of wound stator 24 of device 22 is connected by way of a lead 37 with the input of aileron channel amplifier 13, the output of the latter being connected with aileron servomotor 15 by way of a cable 38. Assuming clutch 17 to be engaged, motor 15 operates in response to the displacement signal at device 22 to displace aileron 19 and at the same time develops a follow-up signal at follow-up devices 36 in opposition to the displacement signal. For this reason, the opposite end of wound stator 24 connects by way of a lead 39 with a resistor 40 mounted across wound stator 34, one end of the resistor being grounded as shown. A resistor 41 is also connected across leads 37 and 39 so that the displacement and follow-up signals measured as voltage drops across resistors 40 and 41 are connected in series for algebraic summation and insertion into amplifier 13.

One side of the rate pick-off or inductive device 28 is connected by way of a lead 42 with the input of rudder channel amplifier 12, the output of which connects with rudder servomotor 14 by way of a cable 43. Assuming clutch 16 to be engaged, motor 14 operates in response to a turn displacement signal developed at device 28 to displace rudder 18 and at the same time develops a follow-up signal at follow-up device 35 in opposition to the turn displacement signal. The opposite end of wound stator 27 connects by way of a lead 44 with a resistor 45 mounted across wound stator 33 of follow-up device 35, one end of the resistor being grounded as shown. A resistor 46 is also connected across leads 42 and 44 so that the turn displacement and rudder follow-up signals, measured as voltage drops across resistors 45 and 46, are connected in series for algebraic summation and insertion into rudder amplifier 12. Both leads 39 and 44 may be provided with adjustable taps as shown relative to resistors 40 and 45 for sensitivity adjustment purposes.

With the foregoing arrangement, assuming clutches 16, 17 and 21 to be engaged, it will be apparent that in response to a change in heading of a craft embodying the novel steering system hereof, the craft being caused to bank in the direction of the turn, the displacement signal developed by compass 10 and generated by device 22 energizes servomotor 15 by way of amplifier 13 to displace aileron 19 in a manner to bank the craft in an opposite direction whereby the craft is caused to return to its initial heading. Upon operation of motor 15 to displace aileron, follow-up device 36 is also operated to develop a follow-up signal opposing the displacement signal, such follow-up signal gradually increasing until it is equal to the displacement signal whereupon motor 15 is deenergized. As the craft returns to its initial heading, the displacement signal drops to zero and the follow-up signal prevails to reverse operation of motor 15 to return aileron surfaces 19 to a normal position at which time the follow-up signal drops to zero and the motor is again deenergized.

Should, on the other hand, the craft bank about its roll axis, it will be caused to turn or change heading about its yaw axis in the direction of the bank. Change in heading will manifest itself by a signal at compass 10 which operates aileron servo 15, as above described, to re-establish the normal attitude of the craft and return it to its initial heading.

During a change in heading, the craft develops a rate of turn to which rate gyro 11 responds to displace inductive device 28 whereby a signal is generated in the latter proportional to such rate of turn. This signal is communicated to the input of rudder channel amplifier 12, the output of which energizes rudder servomotor 14 to displace rudder 18 in a direction to return the craft to its initial heading. Upon energization of motor 14 to displace rudder, rudder follow-up device 35 is also operated to develop a follow-up signal opposing the turn signal of device 28, such follow-up signal gradually increasing until it is equal to the turn signal whereupon motor 14 is deenergized. As craft change in heading terminates the rate of turn signal drops to zero and reverses as the craft returns to its initial heading, the turn signal now aiding the follow-up signal in hastening centralization of the rudder to thereby overcome craft oscillation about its desired course. As the craft achieves its initial heading, both the turn signal and the follow-up signal will have dropped to zero to deenergize motor 14.

The operation of the elevator surface (not shown) is conventional in that a signal developed at the pitch take-off of a gyro vertical operates the elevator servomotor, the latter also actuating a follow-up device in the manner more fully shown and described in the aforementioned copending application. By controlling craft direction through aileron in the manner above described, smooth and coordinated flight control is obtained.

In addition to controlling rudder surface 18 in accordance with the turn signal of inductive device 28 and the follow-up signal of inductive device 35, it may also be controlled in accordance with the displacement signal of compass 10. This arrangement is disclosed in Figure 2 wherein parts corresponding to like parts in Figure 1 are designated with the same reference characters plus one hundred. In this latter arrangement, one side of inductive displacement signal device 122 is connected by way of a lead 150, through an adjustable tap 151, with resistor 140 arranged across aileron follow-up device 136, the opposite side of device 136 connecting by way of lead 152 with the input of aileron amplifier 113. Resistor 140 is not grounded as in Figure 1 but resistor 141 is grounded as shown while a lead 153, tapped to lead 150, is connected with one side of device 128, the opposite side of which is connected by way of an adjustable tap 154, contacting resistor 146, with a lead 155. The opposite end of lead 155 connects with one side of the stator of rudder follow-up device 135, the opposite end of which connects with the input of rudder amplifier 112 by way of resistor 145, which in this case is ungrounded, an adjustable tap 156 and a lead 157.

With the above arrangement, the displacement signal of device 122 is fed in series with the follow-up signal of device 136 to the input of amplifier 113 to control aileron servo 115, the circuit for these signals being traced from ground, resistor 141, lead 150, tap 151, resistor 140, lead 152, to amplifier 113 and back to ground. For rudder control, on the other hand, the displacement signal of device 122 is fed in series with the turn signal of device 128 and the follow-up signal of device 135 to the input of amplifier 112, the circuit for the latter signals being traced from ground, resistor 141, lead 153, resistor 146, tap 154, lead 155, resistor 145, tap 156, lead 157 to amplifier 112 and back to ground.

The operation of the system of Figure 2 is the same as that of the arrangement of Figure 1, above described, with the exception that in the rudder channel, when the craft turns off course, the displacement and the rate of turn signal aid each other and oppose the rudder follow-up signal while on craft return to its initial course the displacement signal gradually diminishes in value while the rate of turn signal reverses in phase to aid the follow-up signal.

With the use of the systems of either Figure 1 or 2 the need for gyro stabilization of the craft about its roll axis has been eliminated. Where, however, such gyro stabilization is desired for some reason, the arrangement of Figure 3 may be utilized in which parts having like parts in Figure 1 are designated with the same reference characters plus two-hundred. Rudder control is effected in the same manner as shown in Figure 1, i. e., the turn displacement signal developed by device 228 and appearing across resistor 246 is fed into the input of rudder amplifier 212 in series with the rudder follow-up signal of device 235 to energize rudder servomotor 214.

In addition to the displacement signal of device 222 and the follow-up signal of device 236, aileron servomotor 215, on the other hand, is also controlled by a bank signal developed in an inductive bank device 260. Bank signal generating device 260 comprises a fixed wound stator 261 and a movable inductively coupled wound rotor 262 which is connected to the bank axis 263 of a conventional gyro vertical 264. A resistor 265 is mounted across stator 261 and has one end thereof grounded as shown. An adjustable tap 266 contacts resistor 265 and connects by way of a lead 267 with one side of the aileron follow-up device 236 across which is mounted a resistor 240. The latter resistor is engaged by an adjustable tap 268 which connects with one side of device 222 by way of lead 239, the opposite side of which communicates with the input of amplifier 213 by way of a lead 237.

Any departure by the craft from a desired course, therefore, causing the craft to blank in the direction of the turn, will manifest itself in a displacement signal appearing at inductive device 222 and a bank signal appearing at inductive bank device 260, the two signals acting in aiding relation to oppose the follow-up signal of inductive device 236 in controlling operation of aileron servomotor 215.

It will now be apparent to those skilled in the art that a novel and improved automatic steering system for mobile vehicles such as aircraft, guided missiles, etc., has been provided hereby wherein by controlling craft direction through aileron smooth and coordinated flight control is obtained adding materially to passenger comfort.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

We claim:

1. An automatic steering system for an aircraft having a rudder and a roll control surface, comprising servomotors adapted for operating said surfaces, an electrical signal developing device operably associated with said rudder servomotor and comprising a wound fixed stator and a relatively movable wound rotor inductively coupled with the stator and operable by said rudder servomotor for generating a follow-up signal in the stator, a second electrical signal developing device operably associated with said roll surface servomotor and comprising a wound fixed stator and a relatively movable wound rotor inductively coupled with the stator and operable by the roll surface servomotor for generating a follow-up signal in the latter stator, reference means adapted to be mounted on said craft and comprising a third electrical signal developing device having a wound fixed stator and a relatively movable wound rotor inductively coupled with the stator and operable by said reference means for generating a direction displacement signal in the latter stator in response to a craft departure from a predetermined course, electrical means operably associated with said rudder servomotor and connecting the stator of the third electrical signal developing device in series with the stator of the first electrical signal developing device for operating said rudder servomotor, and electrical means associated with said roll surface servomotor and connecting the stator of the third electrical signal developing device in series with the stator of the second electrical signal developing device for operating said roll surface servomotor whereby said roll control surface is under the influence of only said direction displacement and roll surface follow-up signals.

2. Coordinated flight control means for an aircraft, comprising rudder and aileron servomotors, a rudder follow-up electrical signal developing device operably associated with said rudder servomotor, an aileron follow-up electrical signal developing device operably associated with said aileron servomotor, reference means responsive to craft displacement from a prescribed heading, a single heading displacement electrical signal developing device operably associated with said reference means, a second reference means responsive to the craft rate of turn, a rate of turn electrical signal device operably associated with said rate of turn reference, electrical means connecting the heading displacement signal developing device in series with the aileron follow-up signal developing device to said aileron servomotor, and electrical means also connecting the heading signal developing device, the rate of turn signal developing device, and the rudder follow-up signal developing device in series for operating said rudder servomotor whereby said aileron servomotor and said rudder servomotor are connected by electrical means so that the same heading displacement signal is sent to both motors.

JOHN C. OWEN.
ALAN M. MacCALLUM.

References Cited in the file of this patent

UNITED STATES PATENTS

| Number | Name | Date |
| --- | --- | --- |
| 2,351,977 | Kronenberger et al. | June 20, 1944 |
| 2,401,168 | Kronenberger | May 28, 1946 |
| 2,452,311 | Marksusen | Oct. 26, 1948 |
| 2,464,629 | Young | Mar. 15, 1949 |
| 2,471,821 | Kutzler | May 31, 1949 |
| 2,516,796 | Noxon et al. | July 25, 1950 |